United States Patent
Karlin et al.

(10) Patent No.: US 12,456,353 B2
(45) Date of Patent: Oct. 28, 2025

(54) AUDITORY REPRESENTATION OF VIRTUAL FANTASY SPORTS

(71) Applicant: Virtual Draft, LLC, Las Vegas, NV (US)

(72) Inventors: Michael Joseph Karlin, Bethesda, MD (US); Alberto Murat Croci, Washington, DC (US)

(73) Assignee: Virtual Draft, LLC, Chevy Chase, MD (US)

( * ) Notice: Subject to any disclaimer, the term of this patent is extended or adjusted under 35 U.S.C. 154(b) by 294 days.

(21) Appl. No.: 18/206,467

(22) Filed: Jun. 6, 2023

(65) Prior Publication Data

US 2024/0412601 A1 Dec. 12, 2024

(51) Int. Cl.
*G07F 17/32* (2006.01)
*G06Q 50/34* (2012.01)

(52) U.S. Cl.
CPC ......... *G07F 17/3288* (2013.01); *G06Q 50/34* (2013.01); *G07F 17/3211* (2013.01)

(58) Field of Classification Search
None
See application file for complete search history.

(56) References Cited

U.S. PATENT DOCUMENTS

| | | | |
|---|---|---|---|
| 8,888,584 B2 | 11/2014 | Cohen et al. | |
| 10,569,180 B2 | 2/2020 | Croci et al. | |
| 11,305,198 B2 | 4/2022 | Croci et al. | |
| 2009/0270172 A1* | 10/2009 | Sorrells | A63F 13/30 463/9 |
| 2017/0128840 A1* | 5/2017 | Croci | A63F 13/335 |
| 2020/0188799 A1* | 6/2020 | Croci | A63F 13/828 |
| 2021/0154588 A1* | 5/2021 | Wagschal | A63F 13/828 |

* cited by examiner

*Primary Examiner* — Ronald Laneau
(74) *Attorney, Agent, or Firm* — Boswell IP Law; J. Mason Boswell

(57) ABSTRACT

A fantasy sports audio simulation system that provides an audio experience that allows contest participants and spectators to listen to a simulated virtual fantasy sports contest. These simulations can occur at any time between any two or more contest participants, like mini contests within the context of a broader league. Once a league is formed and team rosters are created, numerical calculations are performed based on real-athlete statistics to determine a current "state" of performance for all virtual athletes in gameplay. Further simulation inputs can be provided by artificial intelligence, coaching, randomization, and other factors. This statistical analysis is the basis for assigning performance variables to each virtual athlete, which allows the system to calculate numerical point values based on the performance of each virtual athlete and team in this fantasy sports auditory simulation system. Participants can experience the simulation through a variety of audio/listening devices, including extended reality.

20 Claims, 3 Drawing Sheets

AUDITORY REPRESENTATION OF VIRTUAL FANTASY SPORTS

CROSS-REFERENCE TO RELATED APPLICATIONS

The present application is related to U.S. Pat. No. 11,305,198 entitled "VISUALLY REPRESENTING VIRTUAL FANTASY SPORTS CONTESTS II," and filed on 2020 Feb. 24, which is a continuation-in-part of U.S. Pat. No. 10,569,180 entitled "VISUALLY REPRESENTING VIRTUAL FANTASY SPORTS CONTESTS," and filed on 2016 Nov. 6, which claims the benefit of U.S. Provisional Patent Application No. 62/251,954 entitled "SIMULATED VIRTUAL GAMES BASED ON DATA FROM REAL-WORLD COMPETITIONS," and filed on 2015 Nov. 6, each of which is hereby incorporated by reference.

BACKGROUND

A fantasy or simulation sports game or contest is an event in which each participant forms one or more virtual teams that use real-world, professional, or amateur athletes, and participants compete against other participants (or, in some cases, the operator) in competitions in which the outcome is determined by the statistical performances in real-world events of the athletes on each participant's virtual team. Depending on the contest variant, a contest may be season-long in duration (sometimes referred to as a "traditional" fantasy sports contest) or may last only a single week or even a single day ("daily fantasy sports," or "DFS"). In the common season-long variety, no single athlete can be on more than one virtual team in a league, participants are usually allowed to trade athletes on their virtual teams with other participants in the league, and from time to time participants decide which athletes on their virtual teams to play, while the other athletes are on a virtual "bench," and thus any statistics they generate do not count for the contest participant.

In the common weekly and daily contest varieties, participants select a new virtual team (or teams) at the outset of each weekly or daily contest. More than one participant may select the same athletes, but each athlete is assigned a salary value, and the selection of each virtual team is subject to a salary cap. In this variant, there is no trading of selected athletes and the performance of each athlete selected for a team counts for the selecting participant—i.e., no selected athlete is "benched." In the common daily and weekly variants, as well as in the common season-long variant, the statistical performances of athletes in real-world events are converted into points pursuant to a structure made known to the participants in advance, and points are compiled and totaled to determine the outcome of each contest. Participants sometimes make use of computer modeling to assist them in the selection of athletes for their virtual ("fantasy") teams. Alternatively or additionally, other types of games or events may also serve as the basis for a contest, such as educational games and contests.

Two or more fantasy sports contest participants compete against each other by building a virtual team of professional or amateur athletes from a real-world league or competition, and earn points based on the actual performance of those athletes in real-world competitions. Fantasy sports contests—whether traditional or DFS—can be structured in the form of competitions where participants pay an entry fee to participate, and participants may win all or a share of a prize depending on their overall performance in the competition.

In such competitions, a percentage of the entry fees often goes to the operator of the competition as revenue. Entry fees may or may not fund the prize fund.

Sports play is conduct and action of an athlete during the game. Examples include a particular act or maneuver in a game such as: (1) in American football, the action during an attempt to advance the ball down the field, (2) in baseball, the action in which a batter or runner is put out, (3) in soccer, the action of kicking a penalty kick and having the opposing team's goalie attempt to stop the ball from entering the goal, (4) in basketball, the action of dribbling to the hoop and shooting the ball into the opposing team's basket, (5) in soccer, a defender sliding toward a ball which is in control of an opponent.

There are several problems encountered by fantasy sports operators and participants today in the United States. First, fantasy sports operators and participants must comply with applicable legal statutes and related regulations (such as the federal Unlawful Internet Gambling Enforcement Act (UIGEA), codified at 31 U.S.C. § 3701 et seq.). In addition, the duration of a fantasy sports contest is limited by the duration of the season of the real-world sport (e.g., the NFL football season). This can place both an upper and lower bound on the play of fantasy sports. For example, operators that wish to offer participants a day-by-day or week-by-week experience for a sport with a long season may have to develop special game play rules to allow for a quicker result. On the upper end, operators that wish to offer participants the ability to continue playing a certain variant of fantasy sport contest beyond the duration of the season applicable to the relevant sport may be unable to do so because the real-world sport providing the statistics used by the fantasy sport contest has ended for the season.

In recent years, audio content has increased in popularity for entertainment, information, and other purposes. New forums such as podcasts, have increased the market for new forms of audio entertainment. For example, services like Audible TM provide subscription services to audiobooks. People are often performing other activities, such as driving, that do not allow for complete visual attention to entertainment. In these environments, audio provides entertainment without distracting the listener's visual attention. People can do many other things while listening to content, such as working on projects, cooking, performing chores, driving, and so forth. However, there are limited forms of available audio content. Some audio content is static and does not change, such as an audiobook that can be listened to at any time and have the same content. Other audio content is ever-changing, such as news, weather, and traffic, which have for many years been available through audio via radio and other services.

DETAILED DESCRIPTION

Figure 1:
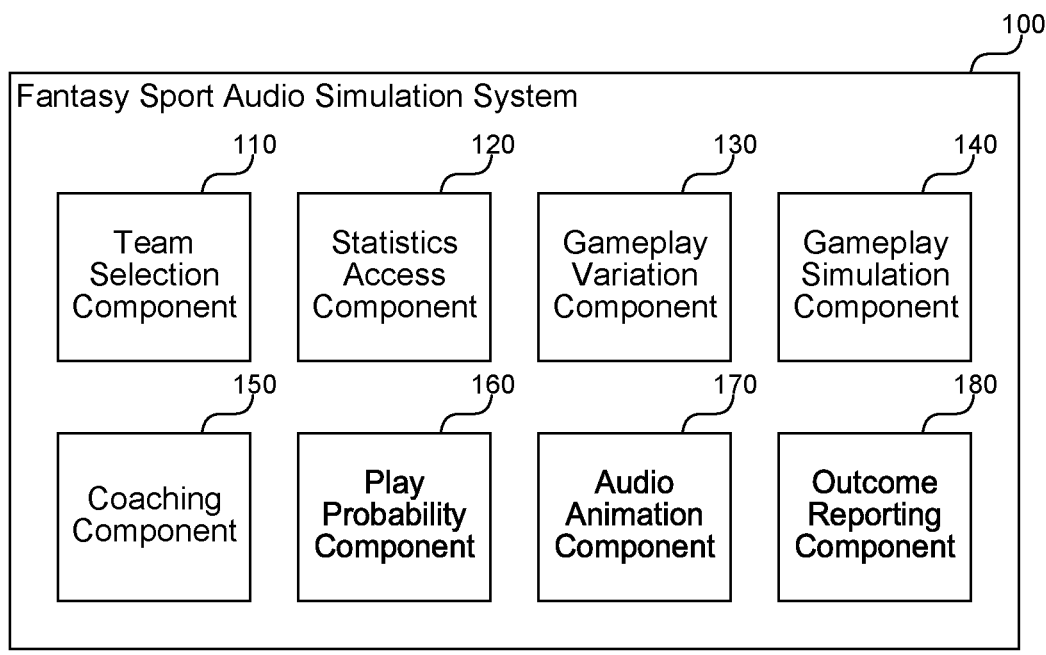
FIG. 1 is a block diagram that illustrates components of the fantasy sport audio simulation system, in one embodiment.

A fantasy sports audio simulation system is described herein that provides an audio experience that allows contest participants and spectators to listen to a simulated virtual fantasy sports contest based on the real-world statistics generated by athletes competing in their applicable sport in actual, real-world competitions. With respect to traditional (i.e., season long) fantasy sports contests, once a fantasy sports league (i.e., group of fantasy sports participants competing against each other) is formed and fantasy team rosters are created, numerical calculations can be performed based on real-world athlete performance to determine a current "state" of all of the fantasy sport virtual athletes at any time during the operation of the contest. This statistical analysis is the basis for assigning performance variables to each virtual athlete, which allows the system to calculate numerical point values based on the performance of each virtual athlete and team during gameplay. Fantasy sports participation has traditionally involved reviewing a lot of visual information, such as reviewing statistics and player performance on a web site. The fantasy sports audio simulation system, among other things, provides an audio experience that brings to life this numerical exercise in a manner that allows participants and spectators to listen to a videogame-like model simulating a head-to-head game between two fantasy sports teams that are involved in a fantasy sports contest. The system is designed so that users can have a completely audio-only experience and enjoy the richness of the game being simulated like listening to a real sporting event on audio channels (e.g., radio), although the system is not limited to audio only experiences and where desired by an implementor can be combined with other forms of media entertainment.

The audio experience provided by the system may include a variety of types of audio information. For example, audio information may include a virtual announcer that provides a play-by-play audio description of the action portrayed by the videogame-like model. The audio description may describe what particular players are doing (e.g., throwing a pass, receiving a kick, and so on), what game elements are doing (e.g., the ball is flying through the air towards the goal), ancillary information (e.g., what is going on in other games, why a player is not playing due to injury, and so forth), weather information (e.g., it is starting to rain in the stadium), and other information related to the simulation. An announcer may be human or virtual and may read from a script generated by the system or may have speech auto-generated by the system to convey the actions occurring in the simulation.

Audio information may include other sounds in addition to the audio information described above, such as sounds of players performing their actions (e.g., crashing into each other during the play, the ball bouncing against a virtual surface, and so on), and weather or other background noises (e.g., crowds cheering or rain hitting the field). Sounds used may be pre-recorded sounds from real games or may be computer generated digitized play sounds. Some sounds may be tied directly to the data in the simulation, such as simulating the noise and activity surrounding a football kickoff, while other sounds may be randomly generated, such as occasionally playing a cheer or jeer directed to a player.

These game simulations can be made to be played at any time and between any two fantasy sports contest participants, and can convey all or a part of the virtual contest between two virtual fantasy teams within the context of the broader on-going fantasy sports contest. Although each fantasy sports contest is based on the performances of real-world athletes in real-world sports events, the fantasy sports game simulations contemplated herein can be run at any time—i.e., they are not tied to the duration and schedule of real-world events or seasons. In other words, two fantasy sports contest participants could decide to run a fantasy sports game simulation between their fantasy sports teams using all known past data about the athletes they selected, and the fantasy sports game simulation might last only a few minutes (or hours or days, depending on the fantasy sports game variant). In this way, the fantasy sports game simulations contemplated herein are not limited by the season for the real-world sports on which they are based. The game simulations can be conducted at any time—during the season or after the season has ended.

The fantasy sports audio simulation system contemplated herein provides a software platform that conveys fantasy sports games between two fantasy teams within the broader context of fantasy sports contests. The system statistically determines the outcome of sports play interactions in a virtual game played between two virtual (i.e., fantasy) teams of real-world athletes which have been selected by two competing fantasy sports participants. In this variant of fantasy sports contest, the outcome of a head-to-head competition between two virtual fantasy sports teams is determined mathematically by a computer utilizing the statistical data resulting from the real-world performances of real-world professional or amateur athletes who are being depicted as virtual athletes within the virtual fantasy sports game. The data resulting from the real-world performances of athletes from their current and/or previous season(s) are used to generate the data inputs into the software platform and the software platform makes its calculations on such data (e.g., to determine success or failure and degree of success, such as yards gained, of individual simulated plays).

The system's mathematical calculations utilize one or more conditional probability statistics theorems, such as Bayes' theorem, when calculating athlete interactions within the virtual game. This type of calculative ability can simulate real-life game play as if the selected virtual athletes were actual athletes interacting against one another in real gameplay. Using conditional probability statistics, virtual athlete interactions within gameplay can be inferred through probabilistic weighting (using real-athlete data) and can consider variables such as the strengths and weaknesses of fellow teammates when assisting other teammates during gameplay.

The statistical analysis of the data (i.e., conversion into points in accordance with the fantasy sports game rules) is conveyed through audio in the form of a simulated virtual game played between the virtual teams and viewed on the terminals of participants and/or spectators. The statistical analysis of data as well as the conversion of the data into points may be conducted in at least three ways: 1) in real-time, as the virtual game is taking place on the terminals of participants and/or spectators, 2) in segments, calculated immediately before the play is displayed on the terminals of participants and/or spectators, 3) in advance, all the game's conditional probability calculations are made in advance of the virtual game and played on the terminals of the participants and/or spectators as the game is played out. When using the optional coaching feature of the system, the system would limit calculations to versions #1 (if decisions are made during periods of the game where coaches may have input) and version #2 to most closely mirror coaching inputs from real sports play. For the real time statistical data analysis method above (1), which incorporates virtual-athlete statistical data derived from the virtual game and factors this new performance data (in a weighted manner) in with the real-athlete's existing data, the incorporation of this data is done in real-time and the system is continuously (however subtly) updating the virtual athletes' performance inputs until the end of the contest.

The fantasy sport audio simulation system has a significant impact on the problems described above. First, it allows for continued play among fantasy sports participants both on a shorter and longer basis than the real-world sport season on which it is based. Participants can play quick daily virtual games and can play outside of the normal season. In addition, the system as designed in some embodiments may meet the requirements of the UIGEA fantasy contest exception or other applicable laws to be exempt from that or other laws. Thus, the fantasy sports audio simulation system may provide new ways to engage fantasy sports participants including during post-season and other times that were previously unavailable.

In some embodiments, the fantasy sports audio simulation system determines fantasy sports virtual teams scores mathematically by a computer utilizing the real-world statistical data resulting from the performances of the applicable real-world professional or amateur athletes—i.e., those athletes selected to be on the fantasy sports team. Those selected athletes can either be depicted as virtual athletes within the virtual game presented by the fantasy sports audio simulation system or in the case where athlete likenesses are not licensed (if licensing is required), the depiction of virtual athletes can be fictitious and/or by using avatars. Individual real-world statistical data from an athlete's current and/or previous season(s) can be the basis of data inputs into the calculations of this software platform (statistics can be based on Bayesian or another statistical theorem that can infer future performance of an athlete from that athlete's historic individual performance data). The net outcome of the statistical analysis of the data is depicted and displayed in the form of a simulated virtual game played between the virtual teams and viewed on the terminals of participants and/or spectators. The win/loss outcome of the virtual game results from the totality of the individual relevant athletes' performances from both teams.

In some embodiments, the fantasy sports audio simulation system includes a software component for selecting contest participants by participant-initiated hosting. Any participant may set up various criteria to host a contest at any time during the day. Any registered participant can log into a website or other user interface provided by the component and stipulate the criteria of the contest, such as: a) the number of participants, b) the time for each game, c) one of the pre-set prize allocations for the top participants, d) the minimum or maximum level of games played and level of skill rating (a rating is a measure of skill of a participant), and/or e) a feature that allows a host participant to set one or more variables to account for game play randomness. The amount of randomness may be configurable based on jurisdiction or other factors to comply with local laws and regulations.

In some embodiments, the fantasy sports audio simulation system includes a software component that allocates virtual money to each contest participant and each participant then has a limited time to allocate his or her virtual money toward the recruitment of athletes for his or her virtual team. The participant who bids the highest amount for each athlete is awarded that athlete on their team. A second and subsequent round of drafting may commence until each participant has a complete virtual team. In some embodiments, at the end of the drafting rounds, if two participants have bid the same amount on the same athlete and neither participant wants to exchange that athlete for a different athlete or raise their bid for the athlete in question, that athlete becomes ineligible for both participants within an amount of time (e.g., one minute), and the tournament participants select another athlete based on an alternate method such as first to select, and in some cases may use the amount they had bid on the previous athlete to select a new one.

In some embodiments, the fantasy sports audio simulation system includes a software component that utilizes statistical data of individual real-world professional or amateur athletes from current and/or previous season(s) performance(s). The component can infer and calculate the outcome of a virtual game played between any selection of athletes forming a fantasy team, and for any sport from which individual athlete statistics are available. In some embodiments, the system will not determine the outcome of the game beforehand. The game's result will be calculated from a summation of the individual athlete's performances, which themselves are calculated from statistical analysis. The result may also include some factor of randomness to vary the game outcome.

In some embodiments, the fantasy sports audio simulation system includes a software component that conveys the statistical analysis of the data and plays audio representing the analysis in the form of a simulated virtual game played between the virtual teams and listened to on the terminals of participants and/or spectators. In some embodiments, the fantasy sports participants have powers to "coach" the virtual athletes similar to how a real-world coach might coach real-world athletes (although in some embodiments the participants cannot manipulate the virtual athletes through manual control of their movements or actions), so as to make play calls, select formations, and take athletes in and out of the game (just as a real-world coach could do). The coaching features add an additional layer of skill to the fantasy sports contest that may also affect the outcome. Features such as coaching can use audio input, such as the participant speaking to the system to make play calls. Virtual assistants such as Siri, Alexa, and Hey Google or any other voice command software may be used to provide transcribed audio input to the system that the system acts on to perform the participant's intended actions. Availability of the coaching and other features may vary based on jurisdictional or other concerns.

In some embodiments, in games such as football or baseball, an optional setting will allow the participants to cause the system not to calculate the outcome of the virtual game in advance. Rather, the games will be broken into individual plays, allowing each contest participant, acting as a virtual "coach," to make decisions that affect that outcome of that individual play. In some embodiments, after the software component has determined the actions of each athlete on each team based on statistical probability, the graphical representation of this result is transmitted to the terminals of participants and/or spectators. Terminals, as used herein, may include a mobile device such as a smartphone or tablet, an in-car mobile device, or any other type of computing system able to run the audio simulation system.

In some embodiments, the fantasy sports audio simulation system includes one or more server and client components that operate together over a network (such as the Internet) to enable communication between the participants and to carry out the functionality described herein. Servers may include a cloud computing or other platform to which multiple client devices can connect and over which they can communicate. Client computers may include one or more mobile devices, laptops, desktop computers, set top boxes, or other computing devices that can connect to the server computer. The client devices may provide a user interface via a web browser, custom application, or other facility through which the features described herein are presented to the user(s) of the system. Where the term "terminal" is used herein, it is intended to refer to such client devices, and not to be limited to historical "dumb" terminals.

In some embodiments, the server conducts the calculations and sends results back to the client computers for further processing to convey through audio the data as the virtual gameplay, and the client computers of each participant and spectator that are interfaced with the server for that particular virtual game may listen to the gameplay unfold. Inputs from participants are transmitted to the server for real-time calculations, and such statistical calculations are then transmitted back to the client computers of the participants and spectators. The entire virtual game can be played out in this manner as calculated by the statistical engine of the server. In other embodiments, the entire function of the system may transpire on a single client device, with or without a server.

In some embodiments, the fantasy sports audio simulation system includes a feature which, when activated, allows the fantasy sports participants to act as coaches, so that, for example, they are able to make play calls, select play formations, decide on fourth down (in American football) whether to punt, try a field goal or go for a first down conversion, put athletes in and out of the game, call time outs, and so forth. The coaching features add an additional layer of skill to the fantasy sports contest and can improve the gameplay for years to come.

In some embodiments, the fantasy sports audio simulation system includes a feature allowing a host participant and/or a host company the ability to set a random variable percentage that factors deviations from the statistical calculations of the calculated outcomes. Such deviations are intended to mimic factors other than athletes' statistical data such as effects of weather, an athlete with an off-day performance, the physiological distractions of playing in away games, and so on. These and other factors, which may not be accounted for in athletes' historical data, can be introduced and factored into gameplay based on the setting that a host participant selects from in the beginning of the contest. The results of these calculations can be conveyed through audio information, such as hearing that rain has started, or an announcer announcing that a player is being substituted on the field. In some embodiments, each participant can see the settings of the host participant prior to accepting participation in a contest. In some embodiments, this randomness feature can be set by the host from 0% (no randomness factor) to some upper deviation and the host's calculations will be factored into the mathematical calculations of the virtual athletes' game play. The amount of randomness applied may vary by jurisdiction to comply with local laws and regulations.

The system described herein can be used in every team sport or other event that has statistical athlete data available, and the examples herein are not meant to be limiting. Event examples include Baseball, Basketball, Football, Soccer, Handball, Rugby, Hockey, Lacrosse, Cricket, Bandy, Futsal, individual sports that can be played in a team configuration such as team golf, and "eSports"—i.e., electronic video games of skill participated in by players on organized teams. The system may also be applied in contexts in addition to sports, such as reality TV show performances, game shows, educational events, and so forth.

In some embodiments, the fantasy sport audio simulation system provides the ability for the "house" (the contest operator) or a contest participant (i) to create a private or public league with some number of (e.g., up to 20) athletes, (ii) to create a private game only inviting the specific people against whom he chooses to play, (iii) to allow contest participants to swap athletes, (iv) to allow participants to save their fantasy teams for future matches, (v) to permit contest participants to have more than one fantasy team per contest, (vi) to create and manage a frequent participant reward system, (vii) to allow participants to save certain athlete lineups, and (viii) to create fantasy sports contests involving athletes and/or athlete statistics from different time periods and eras, including using athletes at different points along their careers.

In some embodiments, statistics are only relevant when compared to the situation in which those statistics were generated. For example, if athletes from the two best American professional football teams (who presumably all have excellent statistics) were pitted against athletes from the two best American collegiate football teams (whose athletes hypothetically have even better statistics), the computer would wrongly calculate the collegiate fantasy team to win a virtual competition, even though the professional level of play is at a considerably higher level than the collegiate level of play. The system can apply a mathematical or other mechanism to correct for this. For example, the system may weigh the statistics so that professional teams are set to a basis that would allow them to generally beat collegiate teams. It might not apply in exclusively professional football league play where all the statistics are generated by professional football athletes (and thus would have equal weighting), but it could apply if contest participants wanted to create a fantasy contest between the worst football athletes in the American professional football league and the best collegiate football athletes. Other factors may also be considered, such as the weight and speed of the players can be considered to alter their matchups.

FIG. 1 is a block diagram that illustrates components of the fantasy sport audio simulation system, in one embodiment. The system 100 includes a team selection component 110, a statistics access component 120, a gameplay variation component 130, a gameplay simulation component 140, a coaching component 150, a play probability component 160, an audio animation component 170, and an outcome reporting component 180. Each of these components is described in further detail herein.

The team selection component 110 receives from one or more game participants a selection of real-world athletes whose associated real-world performance will form the basis for simulation of a fantasy contest based on the athletes' past statistics. The team selection component 110 allows contest participants to each form a team of real-world athletes that may or may not have ever played together in real-world competitions, according to typical principles of fantasy sports. What constitutes a team varies by game type. Some games may have only one athlete per team, while others may have quite large teams. The system 100 may also receive an indication of what position a participant wants each athlete to fill. The received selection of athletes may include additional athletes beyond the normal team number to allow for switching of athlete positions during the game (e.g., using the coaching features described below).

The statistics access component 120 retrieves historical statistical information describing the real-world performance of each selected real-world athlete to act as input to the system. The Internet provides numerous public and private sources of athlete historical statistical information. The system 100 may access and/or subscribe to one or more such sources and access information used to simulate games. The statistical information may include individual athlete performance information (such as yards thrown, yards run, batting average, and so forth) as well as which athletes a certain athlete has played well with previously, and the performance of particular athlete combinations. This information can be used as described further herein to simulate inter-athlete strengths and weaknesses. The system 100 may include one or more revenue models (e.g., receiving money from participants or advertisers) that allow an operator of the system to profitably pay for access to historical statistical information.

The gameplay variation component 130 receives game variation information not based on historical performance that acts as input to the system and causes variation in the game simulation outcome. The input may include one or more factors of randomness that perturb received statistics to cause their value to vary from one game simulation instance to the next. For example, the component 130 may simulate events that may occur for athletes in the real-world, such as injury, weather, home/away advantage, and other factors. Injury, for example, may cause the statistics of an otherwise excellent athlete to fall and potentially even bench the athlete for all or part of a game. Weather, for example, may cause an otherwise great kicker to miss kicks more often. The system 100 may also receive limitations on which statistics are used as gameplay variations. For example, for athletes like Tom Brady that has had a multiple decade football career, participants may wish to limit a particular game to the statistics of 2007 Tom Brady or 2016 Tom Brady, rather than using all this real-world athlete's available statistics.

This could even allow the playing of the same athlete on both teams, allowing 2007 Tom Brady to be played against 2016 Tom Brady to determine who would win a virtual, simulated match up. This is one of several ways that the fantasy sport audio simulation system 100 differs from traditional fantasy sports and can add new and interesting game variations. It is also worth noting that this also differentiates the system 100 from previous simulation technologies that would produce the same result each time the same set of athletes is selected. Participant interest in the simulation can decrease when the result is too certain. Adding variation keeps participants more interested and excited by the outcome.

The gameplay simulation component 140 manages one or more simulated games between the selected real-world athletes using the retrieved historical statistical information and the received game variation information. The gameplay simulation component 140 determines the start and end conditions of the fantasy contest. For example, a fantasy contest's end condition may be determined by one contest participant reaching a target score, by the expiration of an allowed time for the contest, or by the mutual agreement of the contest participants. Start conditions may include the entry of a specified minimum number of contest participants, waiting for a desired start time, or any other conditions. The gameplay simulation component 140 interacts with the coaching component 150, play probability component 160, audio animation component 160, and outcome reporting component 170 to complete an instance of a fantasy contest and determine the result.

The coaching component 150 receives further input from the contest participants in between virtual game plays that affect strategy of which plays are chosen during a simulated (fantasy) game. Unlike some systems, which could simulate a game outcome based only on the initially input historical statistical information and any game variation information, the coaching component 150 allows the fantasy contest participants to vary the game outcome on a play-by-play or other basis. For example, the system 100 might allow contest participants to bench and un-bench athletes at each quarter or during halftime. The system 100 might also allow the contest participants to bias the simulation toward a running or passing play or towards passing to a particular receiver. The coaching component 150 may allow any type of input that a real-world coach would provide to athletes during a real game, and the coaching input may affect the simulated game in the same manner that real-world coaching would. This allows for much more contest participant involvement and for the fantasy contest outcome to be determined by far more than a simple input of statistics.

The in-game play probability component 160 determines the outcome of each play within the fantasy game by applying conditional probability calculations using the retrieved historical statistical information and the received game variation information. The component 160 may also apply any received coaching input as well as effects caused by inter-athlete strengths and weaknesses. For example, two athletes that have played well together in the past or that have complementary statistics may be simulated to perform some level better than their individual statistics might suggest. Coaching input may lead to a particular type of play, and the system may use conditional probability to determine the outcome of that type of play. The system 100 may also apply other factors, such as athlete fatigue for an athlete that has been used for plays repeatedly (e.g., based on yardage, time in game, or other dynamic factors). The play probability component 160 can apply Bayesian probability theory or other conditional probability theory to determine whether each particular play is successful, and if so, how much is gained by the play's success (e.g., yardage in football).

The audio animation component 170 conveys through audio information actions of one or more sprites on one or more devices associated with the athletes to enact the determined outcome of each play provided by the play probability component 160. For example, if the game type is football, and the play is a passing play, then the component 170 describes the formation of each fantasy team at the line of scrimmage, the action of the athletes once the ball is snapped to carry out the particular play, and the pass from the quarterback to the receiver. These are all explained verbally in a way that allows the contest participants and any spectators to be entertained by the audio simulation of the game, much like listening to a real game. This differentiates the system from past text-based systems that displayed only play outcome information (e.g., athlete X threw the ball 30 yards), without any information about what other athletes were doing, whether the catch was particularly difficult (e.g., due to distance or active defenders), and so forth.

Audio animation can be performed in a variety of ways. The system 100 may produce two-dimensional or three-dimensional displays and use audio to describe the objects within those, or may create an audio representation of what is happening in the simulated gameplay without creating any visual display. Many tools are available in the art for animating sprites based on a dataset and physical properties. For example, the Unreal Engine is a common tool used to provide three-dimensional animation of sprites in a virtual world that is near lifelike. The audio animation component 170 can apply these and other tools to produce software objects representing actions in any particular play, as well as the behavior of each of the athletes and external factors (e.g., weather) during the play.

The audio animation component 170 can iterate through these digital representations to describe the action via audio information (e.g., player 5 is running to the 50-yard line attempting to receive the kickoff). Unlike video simulations, where all the produced information is conveyed to the screen, audio performances may include a prioritization of each piece of information to detect where the action is highest within the simulation and describe that information first. Other, lower priority information can be conveyed later or omitted if there is not time to convey all of it via audio. Even though the desired output is audio, it can be useful to create a 3D visual model to place all the players in a virtual world. Audio information can convey spatial information in various ways, such as through the use of surround sound, which may give the listener a sense or where action is coming from (e.g., behind them). This type of audio benefits from a 3D visual model even though the listener is not viewing the information visually.

The outcome reporting component 180 records the outcome of each play, including any change in score associated with each athlete and team. Because each game can be different due to game variation information, team selection, and so on, the system records the outcome of each play so that the contest participants can review and compare outcomes when the contest is over. Contest participants may want to review how many yards an athlete ran during the game, passing yards for a quarterback or receiver, which plays produced a change in score, and so forth. The system 100 records enough information for each play to be able to convey the information desired for any particular implementation of the system 100. The outcome reporting component 180 also records the total score and a winner/loser of each contest. The system 100 may allow contest participants to play virtual championships or a full season, during which several games are played and the scoring across games determines the outcome of the championship or season. They system 100 may provide leaderboards, reports, or other output that contest participants and/or spectators can review or share to gain notoriety for their team selection and coaching acumen. All this information can be provided in audio or other forms depending on the participant's preferred way of receiving the information at any particular time.

The computing device on which the fantasy sport audio simulation system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Program modules include routines, programs, objects, components, data structures, and so on that perform tasks or implement abstract data types. Typically, the functionality of the program modules may be combined or distributed as desired in various embodiments.

Figure 2:
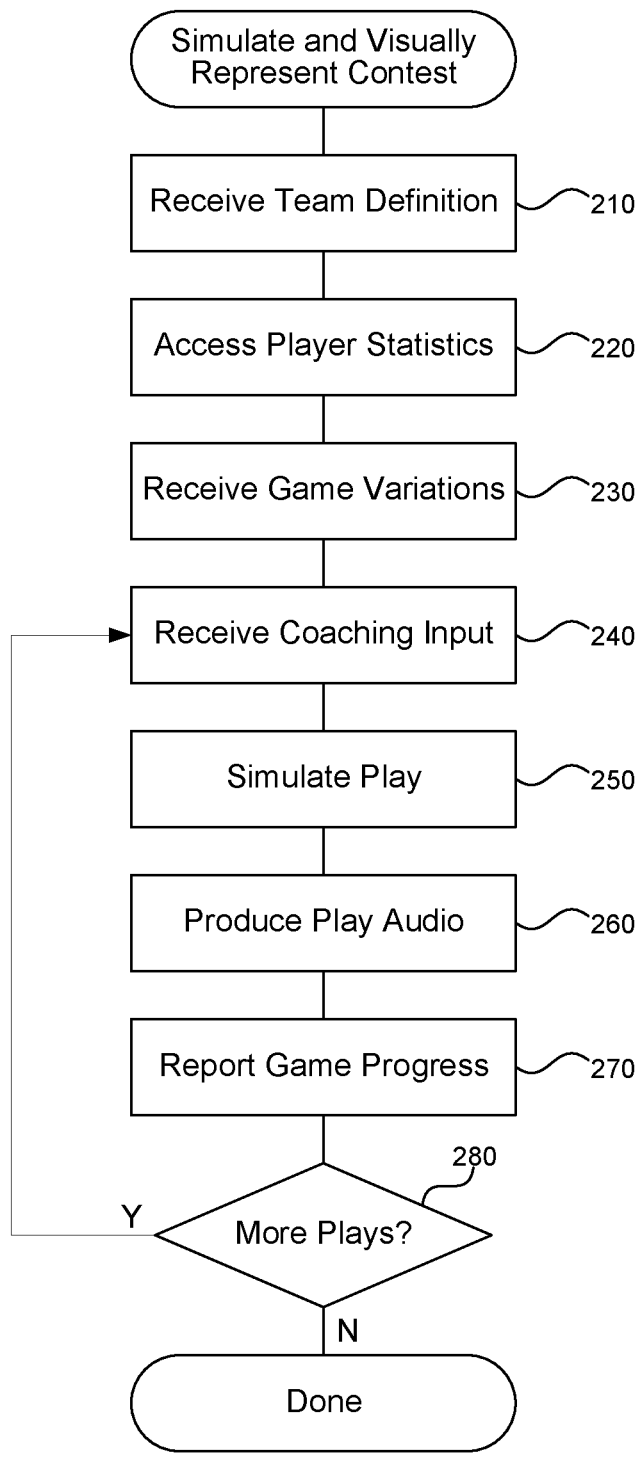
FIG. 2 is a flow diagram that illustrates processing of the fantasy sport audio simulation system to simulate and auditorily represent a game between two or more fantasy teams, in one embodiment.

FIG. 2 is a flow diagram that illustrates processing of the fantasy sport audio simulation system to simulate and auditorily represent a game between two or more fantasy teams, in one embodiment. Beginning in block 210, the system receives a definition of a fantasy team from each of multiple fantasy contest participants, wherein each team is defined by selecting one or more athletes that exist in the real-world and for which past historical statistical information is available. Contest participants may also select athlete roles or positions as well as alternate athletes for each role that can be substituted in during gameplay. The system may provide a user interface, such as a web page or dialog in a mobile application, through which contest participants can search for, review statistics of, and select particular real-world athletes for inclusion on a fantasy team. The system may also provide an audio interface, through which the system reads information to the participants and receives verbal instructions from participants. Interactive voice response (IVR) techniques can also be used to receive a simpler form of input from the participant (e.g., for action A say "1"), where natural language processing (NLP) is not available. Otherwise, NLP can allow the participant to speak instructions to the system in regular language and the system processes the participant's instructions to carry out the participant's intended actions. In some cases, contest participants may be engaged in a traditional fantasy sports league and may provide as input to the system the participants' existing fantasy sports team to use for the simulated games. This allows the system to augment and provide new interest in existing fantasy sports activities.

Continuing in block 220, the system accesses past historical statistical information for each real-world athlete selected for the fantasy teams. The system may access the past historical statistical information from one or more public or private sources of fantasy sports data, including one or more free or subscription-based databases accessed via the Internet or other network. The historical information includes information that can be used as input for conditional probability calculations to determine whether a particular play for a particular athlete will succeed and the degree to which the play will succeed based on the athlete's past real-world performance.

Continuing in block 230, the system receives gameplay variation information that specifies one or more factors that affect play outcome not based on athlete historical statistical information. These factors may include one or more factors of randomness for the system to apply to each athlete's statistical information, external events that may affect athlete performance (e.g., weather, injury, or other), limitations on which of an athlete's statistical information is used (e.g., a particular real-world season or game's statistics), and so forth. A fantasy contest operator may set the gameplay variation information and may or may not publish the parameters used so that contest participants may be aware of them.

Continuing in block 240, the system optionally receives coaching input that determines what play will occur next and how the play will be performed. For example, the contest participants in a contest based on the performance of football athletes may determine whether a running or passing play is simulated next by the system, which athlete receives the ball in a passing play, who shoots in a basketball game, and so on. These and other coaching inputs affect the outcome of the game, while still allowing the simulated game to be based on past historical real-world performance of the athletes. The system may provide a user interface through which contest participants perform coaching via a web page, mobile application, desktop application, or other method to affect the outcome of the simulated game. Coaching input may include calling timeouts, benching/returning athletes to the game, calling categories of plays, and so forth.

Continuing in block 250, the system simulates the next play based on the received coaching input, the historical statistical information of the selected athletes, and received gameplay variation information. Simulation includes applying conditional probability theory to determine whether the play is successful for each team (e.g., whether the offense succeeds in scoring or advancing and whether the defense succeeds in blocking the offense), the degree to which the play is successful (e.g., how many yards are gained, whether scoring occurs, and so forth), and the resulting outcome of the play. The simulation may also include selecting which athletes participate in the play, what actions are performed by other athletes (e.g., did a receiver that did not receive the ball attempt to get open?), and so on.

Continuing in block 260, the system conveys through audio information the simulated play by announcing actions of one or more sprites representing the athletes on a device of the contest participants. Announcing actions of the play includes narrating what actions a two-dimensional or three-dimensional figures on a screen or other display device (e.g., a virtual reality headset) would perform so that the contest participants can experience the play unfold through audio in a similar manner to a real-world play for that sport. The narration may provide a lifelike experience that allows the contest participants to listen to the game much like listening to a real-world game on radio. The audio animation sets the system apart from all past fantasy sports systems by providing a dynamic and auditorily appealing/entertaining depiction of a game based on fantasy sports.

Continuing in block 270, the system reports game progress following the current play. Reporting game progress may include updating a score, reporting on any athletes that were affected by the play (e.g., injuries, suspension from the game, or other outcomes), determining whether the game is complete, and so forth. The system may also record the play outcome in a database or other storage device so that participants or others can review play-by-play outcome information later or listen to the audio animation of a particular play over again (e.g., a replay).

Continuing in decision block 280, if more plays are available for the simulated game, then the system loops to block 240 to receive input for a next play, otherwise the system completes. Factors that define whether more plays are available vary by game type. For example, in football, the game may be defined by a time limit, which may vary based on the level of play (e.g., high school vs. professional). For other game types (e.g., tennis) the availability of more plays may be determined by whether a winning score has been reached by one of the athletes or fantasy teams. At the conclusion of the fantasy game, the system may report the final score and issue any rewards or prizes determined for the fantasy contest winner. After block 280, these steps conclude.

Figure 3:
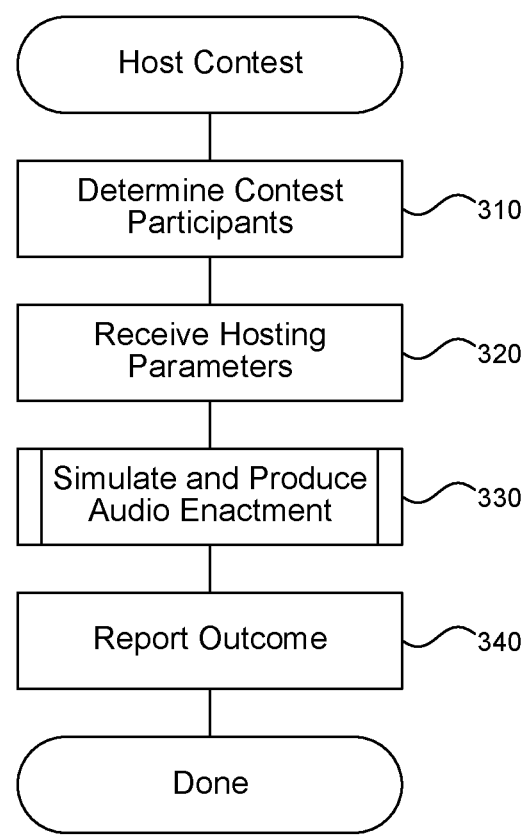
FIG. 3 is a flow diagram that illustrates processing of the fantasy sport audio simulation system to host an auditorily simulated fantasy sports game, in one embodiment.

FIG. 3 is a flow diagram that illustrates processing of the fantasy sport audio simulation system to host an auditorily simulated fantasy sports game, in one embodiment. Beginning in block 310, the system determines two or more contest participants that will compete using a fantasy sports team to provide contest participants the simulated fantasy sports game. The system may host contests within an existing fantasy sports league in which participants in the league are matched up in virtual simulated games to add more interest and entertainment to the existing league. In some cases, the system may provide abbreviated contests in which contest participants can determine how their athletes would fare in individual plays or a portion of a game.

Continuing in block 320, the system receives one or more hosting parameters that determine how the system will introduce variation into the auditorily simulated fantasy sports game so that at least one event during one game differs from at least one event of another contest played between the same contest participants. The system may also receive information such as a prize offered by the contest operator/host or a wager between the contest participants that defines a cash or other prize to be provided to the winner.

Continuing in block 330, the system simulates the game based on the determined participants and the received hosting parameters. This process is described in further detail with reference to FIG. 2. For an abbreviated game, the system may only simulate one or a handful of plays, depending on what is requested of the system by either the host or the participants. Simulating the game, even if only some plays, produces an audio enactment of the game that participants can listen to on one or more devices to experience the outcome of each play of the simulated game.

Continuing in block 340, the system reports the outcome of the simulated fantasy sports game. The outcome may include a score and a declaration of a winner of the game, as well as awarding any prize, money, or reward to the winning contest participant. In some embodiments, the system may oversee a tournament of multiple games simulated between potentially many participants, after which the system may award prizes to one or more of the participants. After block 340, these steps conclude.

The fantasy sport audio simulation system differentiates itself from existing systems in numerous respects. Unlike video game systems (e.g., Madden Football), the fantasy sport audio simulation system does not feature live control of the fantasy athletes. While contest participants may be allowed to impact plays through coaching or game variation selections, participants do not generally move the athletes through a set of moves using a controller. Rather, the system simulates the athletes' movements using historical information, game variation factors, and conditional probability theory that determines the outcome of any play.

Unlike past fantasy sports systems, the fantasy sport audio simulation system breaks the constraints imposed by real-world seasons and allows past real-world historical data to be used to form simulated games that play out in real time. The system also provides more exciting audio entertainment by breaking the mold of very text-based, numbers-heavy implementations of fantasy sports systems that do not provide any audio animation for participants to listen to in real time. Unlike past simulation systems, the fantasy sport audio simulation system produces an audio conveyed animated output, not simply a text-based outcome of each play.

In some embodiments, the fantasy sports audio simulation system uses artificial intelligence and machine learning instead of or in addition to conditional probability when calculating athlete interactions within the virtual game. Artificial intelligence is designed to perceive its environment and take actions to maximize its chance of successfully achieving its goals. In its advanced form, artificial intelligence mimics cognitive functions typically associated with the human mind, including learning and problem solving. This type of calculative ability can simulate real-life game play as if the selected virtual athletes were actual athletes interacting against one another in real gameplay. Using artificial intelligence and machine learning, the system can provide dynamic gameplay with realistic variations from game to game that still fit within the statistical model provided by fantasy sports data.

In some embodiments, the fantasy sports audio simulation system works with virtual, augmented, mixed, and/or extended reality hardware and software to provide a more realistic experience. Virtual, augmented, mixed, and extended reality hardware may include headsets, controllers, cameras, or other hardware that allow the participant to see and feel experiences like that of being in the game. For example, wearing a virtual reality headset the player may see a three-dimensional rendered video of one or more game plays taking place based on the simulation provided by the system. In addition, the participant may hold or wear one or more controllers or sensors that allow the participant to feel what is going on in the game as well as in some cases control what the athlete is doing. As described herein, in some cases it is not desirable to have the participant change the outcome with dynamic control, but there are many things the participant can do, such as looking around, waving, and so forth, that enhance the experience without affecting the outcome. In other cases where dynamic control is available, the participant can use virtual reality controls to play, such as by throwing a ball.

Immersive audio is especially relevant to extended reality (XR) experiences. Users of XR want to feel like they are actually there, having a virtual experience that feels real. Sound cues with audio that comes from the right place and allows users to perceive various spatial attributes accurately draws the user further into the experience. Realistic haptic cues also further enhance the experience. "Spatial audio" is an emerging technology that refers to audio that makes a user feel like they are in the space where the audio occurs. Passing cars, players running by, and other sounds need to come from the direction, from the user's perspective, that they would come from if the action were really occurring. In an auditory fantasy sports experience, this means that sounds can be balanced between the left, right, and potentially other audio channels so that the action has a spatial dimension and appears to come from specific directions as determined by the system.

Augmented reality differs slightly from virtual reality, in that it typically provides a feed from one or more cameras to show the real world and then overlays some virtual items on top of that real world so that the virtual world appears to come into the real world. Using this type of hardware, the system can overlay a depiction of a simulated game on top of a real field, or can let participants immerse themselves more fully in the game by seeing their actual counterparts, but overlaying game elements like the ball, goal lines, and so forth. Mixed reality merges real and virtual worlds to allow physical and digital objects to interact in real time. Extended reality is an umbrella term that includes virtual reality, augmented reality, mixed reality, and new experiences still being developed.

Federal and state laws have changed to allow coaching scenarios that were not originally available under fantasy sports exemptions to gambling laws. In some embodiments, the audio simulation system allows various levels of participant coaching to enhance use of the system. Coaching does not necessarily imply direct control by participants of athletes/players but may include this in some implementations. Rather, coaching input may include adjusting the probability of injuries that could affect the game, as well as adjusting the probability that types of plays are called, such as running versus passing plays in football. This adds a dynamic to games that enhances participant enjoyment while not having to fall outside the statistical backdrop provided by the fantasy sports data.

In some embodiments, the fantasy sports audio simulation system applies randomization during simulation to one or more factors that affect the outcome of gameplay. For example, factors such as weather, athlete injuries, incapacity or reduced performance of athletes, types of plays that are called, and so on can all be varied by the system to provide differences in game play from one simulation to the next. This allows the system to provide a varied and entertaining experience. Many of these features were not permissible under previous law. Even if participants run the simulation many times, they will not become bored by hearing the same events over and over but will see a varied set of events each time because of the randomization. Note that the game outcomes on an aggregate basis may still fall within the statistical historical data underlying the simulation, but randomization allows specific details of the simulation to vary in each instance.

In some embodiments, the fantasy sports audio simulation system can be used by participants to apply one or more "what-if" scenarios to the gameplay data. The participants may inject additional statistical information or may alter received statistical information and invoke the system to run the game simulation based on the injected or altered information. For example, a participant may want to determine how an injury of a particular athlete would have affected the outcome of the simulation, how different weather could have impacted a game, how different coaching choices would have impacted a game, and so forth.

In some embodiments, the fantasy sports audio simulation system uses artificial intelligence (AI) to provide a voice commentary on the action occurring in the simulation. Much like a human commentator at a real sporting event, the commentary may provide play-by-play descriptions, relevant background information on rules or other topics, related information (e.g., weather changes), and so forth. AI may be custom built to use information learned from prior events and may also leverage publicly available AI application programming interfaces, such as ChatGPT. The system may also apply particular voices to the commentary, such as using the voice of a famous announcer, an actor or actress, or famous characters (e.g., Yoda or Darth Vader). The AI may generate multiple commentators using multiple voices, such that two or more commentators can have an AI-generated dialogue about the sports simulation. For example, the system may generate a conversation about the simulation that includes a voice like Marilyn Monroe doing the play by play with a voice like Marilyn Manson.

From the foregoing, it will be appreciated that specific embodiments of the fantasy sport audio simulation system have been described herein for purposes of illustration, but that various modifications may be made without deviating from the spirit and scope of the invention. Accordingly, the invention is not limited except as by the appended claims.

We claim:

1. A computer-implemented method to simulate and auditorily represent a simulated game between two or more fantasy teams, the method comprising:
    receiving a definition of a fantasy team from each of multiple fantasy contest participants, wherein each team is defined by selecting one or more athletes that exist in the real-world and for which past historical statistical information is available;
    accessing past historical statistical information for each real-world athlete selected for the fantasy teams;
    receiving gameplay variation information that specifies one or more factors that affect play outcome not based on athlete historical statistical information;
    simulating a current play based on the accessed historical statistical information of the selected athletes and received gameplay variation information, wherein simulation includes applying processing to determine whether the play is successful for each team, the degree to which the play is successful, and the resulting outcome of the play, wherein determining the resulting outcome includes resolving differences between separate real-world events in which the real-world athletes participated as reflected in the accessed historical statistical information to infer and calculate the outcome of a virtual game played between the athletes that allows participants to view a videogame-like model simulating a head-to-head game between two fantasy sports teams to simulate real-life game play as if the selected virtual athletes were actual athletes interacting against one another in real gameplay;
    auditorily enacting the current play by describing one or more sprites representing the athletes on a device of the contest participants;
    reporting game progress following the current play; and
    if more additional plays are available for the simulated game, then repeating the above steps of simulating, auditorily enacting, and reporting to handle the one or more additional plays until the simulated game is complete, wherein an outcome of the simulated game between two or more fantasy teams is determined mathematically without live player control of the athletes or coaching of the athletes before plays by the fantasy contest participants by a computer utilizing the historical statistical information resulting from real-world performances of real-world athletes who are depicted as virtual athletes within the simulated game.

2. The method of claim 1 wherein applying processing comprises applying artificial intelligence and/or machine learning to determine whether the play is successful for each team, the degree to which the play is successful, and the resulting outcome of the play.

3. The method of claim 1 wherein applying processing comprises applying conditional probability theory to determine whether the play is successful for each team, the degree to which the play is successful, and the resulting outcome of the play.

4. The method of claim 1 wherein auditorily enacting the current play comprises displaying the current play on virtual reality, augmented reality, mixed reality, and/or extended reality hardware used by one or more participants to become immersed in the simulated game.

5. The method of claim 1 further comprising before simulating, receiving coaching input that alters a probability of player injury that impacts the simulated game.

6. The method of claim 1 further comprising before simulating, receiving coaching input that alters a probability of calling a particular type of play that impacts the simulated game.

7. The method of claim 1 wherein gameplay variation information includes one or more randomization effects to vary gameplay in the simulated game.

8. The method of claim 1 further comprising allowing participants to alter or augment the received historical statistical information to determine how the outcome of the simulated game would change with the altered or augmented information.

9. A computer system for auditorily representing virtual fantasy sports contests, the system comprising:
    at least one processor and memory configured to execute software instructions embodied within the following components;
    a team selection component that receives from one or more game participants a selection of real-world athletes whose associated real-world performance will form the basis for simulation of a fantasy contest based on the athletes' past statistics;
    a statistics access component that retrieves historical statistical information describing real-world performance of each selected real-world athlete to act as input to the system;
    a gameplay variation component that receives game variation information not based on historical performance that acts as input to the system and causes variation in the game simulation outcome;
    a gameplay simulation component that manages one or more simulated games between the selected real-world athletes using the retrieved historical statistical information and the received game variation information, wherein simulation includes applying processing to determine whether the play is successful for each team, the degree to which the play is successful, and the resulting outcome of the play, wherein determining the resulting outcome includes resolving differences between separate real-world events in which the real-world athletes participated as reflected in the accessed historical statistical information to infer and calculate the outcome of a virtual game played between the athletes that allows participants to view a videogame-like model simulating a head-to-head game between two fantasy sports teams to simulate real-life game play as if the selected virtual athletes were actual athletes interacting against one another in real gameplay;
    an in-game play probability component that determines the outcome of each play within the fantasy game by applying calculations using the retrieved historical statistical information and the received game variation information;
    an audio animation component that auditorily describes one or more sprites on one or more devices associated with the participants to auditorily enact the determined outcome of each play provided by the play probability component; and
    an outcome reporting component that records the outcome of each play, including any change in score associated with each athlete and team, wherein an outcome of the fantasy contest between two or more fantasy teams is determined mathematically without live player control of the athletes or coaching of the athletes before plays by the fantasy contest participants by a computer utilizing the historical statistical information resulting from real-world performances of real-world athletes who are depicted as virtual athletes within the fantasy contest.

10. The system of claim 9 wherein applying processing comprises applying artificial intelligence and/or machine learning to determine whether the play is successful for each team, the degree to which the play is successful, and the resulting outcome of the play.

11. The system of claim 9 wherein applying processing comprises applying conditional probability theory to determine whether the play is successful for each team, the degree to which the play is successful, and the resulting outcome of the play.

12. The system of claim 9 wherein auditorily animating plays comprises describing the current play on virtual reality, augmented reality, mixed reality, and/or extended reality hardware used by one or more participants to become immersed in the simulated game.

13. The system of claim 9 further comprising before simulating, receiving coaching input that alters a probability of player injury that impacts the simulated game.

14. The system of claim 9 further comprising before simulating, receiving coaching input that alters a probability of calling a particular type of play that impacts the simulated game.

15. The system of claim 9 wherein game variation information includes one or more randomization effects to vary gameplay in the simulated game.

16. A non-transitory computer-readable storage medium comprising instructions for controlling a computer system to host an audio simulated fantasy sports game, wherein the instructions, upon execution, cause a processor to perform actions comprising:
determining two or more contest participants that will compete using two or more fantasy sports teams to provide contest participants an auditorily simulated fantasy sports game;
receiving one or more hosting parameters that determine how the system will introduce variation into the auditorily simulated fantasy sports game so that at least one event during one game differs from at least one event of another contest played between the same contest participants;
simulating the game based on the determined participants and the received hosting parameters, including auditorily representing the plays of the game on a device, wherein simulation includes applying processing to determine whether the play is successful for each team, the degree to which the play is successful, and the resulting outcome of the play, wherein determining the resulting outcome includes resolving differences between separate real-world events in which the real-world athletes participated as reflected in the accessed historical statistical information to infer and calculate the outcome of a virtual game played between the athletes that allows participants to listen to a videogame-like model simulating a head-to-head game between two fantasy sports teams to simulate real-life game play as if the selected virtual athletes were actual athletes interacting against one another in real gameplay; and
reporting an outcome of the simulated fantasy sports game, including a score and a declaration of a winner of the game, wherein the outcome of the simulated fantasy sports game between the two or more fantasy teams is determined mathematically without live player control of the athletes or coaching of the athletes before plays by the fantasy contest participants by the computer system utilizing historical statistical information resulting from real-world performances of real-world athletes who are depicted as virtual athletes within the simulated fantasy sports game.

17. The medium of claim 16 wherein applying processing comprises applying artificial intelligence and/or machine learning to determine whether the play is successful for each team, the degree to which the play is successful, and the resulting outcome of the play.

18. The medium of claim 16 wherein auditorily representing the plays comprises describing the current play on virtual reality, augmented reality, mixed reality, and/or extended reality hardware used by one or more participants to become immersed in the simulated game.

19. The medium of claim 16 further comprising before simulating, receiving input that alters a probability of inclement weather that impacts the simulated game.

20. The medium of claim 16 further comprising before simulating, receiving coaching input that alters a probability of calling a particular type of play that impacts the simulated game.

* * * * *